United States Patent [19]

Jaeschke

[11] 3,742,270

[45] June 26, 1973

[54] SINGLE SUPPORT EDDY CURRENT COUPLING

[75] Inventor: Ralph L. Jaeschke, Kenosha, Wis.

[73] Assignee: Eaton Corporation, Cleveland, Ohio

[22] Filed: Dec. 2, 1971

[21] Appl. No.: 204,111

[52] U.S. Cl. ............................................. 310/105
[51] Int. Cl. ......................................... H02k 49/02
[58] Field of Search..................... 310/105, 103, 106

[56] References Cited
UNITED STATES PATENTS

| | | | |
|---|---|---|---|
| 3,167,674 | 1/1965 | Woodward, Jr. | 310/105 |
| 3,238,402 | 3/1966 | Fehn | 310/105 |

FOREIGN PATENTS OR APPLICATIONS

| | | | |
|---|---|---|---|
| 965,708 | 8/1964 | Great Britain | 310/105 |

*Primary Examiner*—D. F. Duggan
*Attorney*—Marvin L. Union

[57] ABSTRACT

An electromagnetic coupling includes rotatable input and output members, a stationary annular coil supported b a stationary field member, an inductor drum connected to one of the input and output members for rotation therewith and a pole member connected to the other of the input and output members for rotation therewith. The inductor drum is supported only at one end thereof by the one member. The pole member includes first and second annular sets of projections thereon with the projections of the first set having one polarity and the projections of the second set having a polarity opposite the one polarity when the coil is energized. The annular sets of projections are located between the annular coil and the inductor drum. When the coil is energized a flux path is established through the field member, through the first set of annular projections, through the inductor drum, through the second set of annular projections and back to the field member to operatively connect the input and output members. The present construction produces a reliable coupling having a torque transmitting capacity which is generally greater than the torque transmitting capacity of other similar sized couplings.

5 Claims, 3 Drawing Figures

SINGLE SUPPORT EDDY CURRENT COUPLING

The present invention relates to an electromagnetic coupling and more specifically to an electromagnetic coupling having single support type inductor drum and a "cookie" pole type pole member.

Known electromagnetic couplings, such as disclosed in the Sturzenegger U.S. Pat. No. 3,012,160, are of the single support type wherein the inductor drum is supported at one end only in contrast to the double support coupling, such as disclosed in the Winther U.S. Pat. No. 3,121,180, wherein the inductor drum is supported at both ends. The known single support electromagnetic couplings utilize an interdigitated pole structure. The use of an interdigitated pole structure in a single support coupling has been found to be disadvantageous in certain applications due to the torque chacteristics associated therewith. Generally, at high slip, as the difference in speed between the inductor drum and pole member increases, the torque generated in single support interdigitated couplings either remains substantially constant or decreases. This characteristic does not give adequate overload protection in certain instances. Other known magnetic couplings which are of the double support type, such as disclosed in the King U.S. Pat. No. 2,871,383, utilize a "cookie" type pole member wherein the pole member includes a set of non-interdigitated projections thereon which are polarized to opposite polarities at the opposite ends of each of the projections. This construction while advantageous in large couplings, has not met the needs of the industry in small coupling applications.

Accordingly, an object of the present invention is to provide a new and improved electromagnetic coupling which overcomes the hereinabove described disadvantages and which produces increasing torque as the slip between the inductor drum and pole member increases at high speeds.

Another object of the present invention is to provide a new and improved electromagnetic coupling which includes a single support inductor drum, a stationary annular field coil and a pole member having non-interdigitated projections thereon located between the field coil and the inductor drum.

A further object of the present invention is to provide a new and improved electromagnetic coupling as recited in the next preceding paragraph wherein the projections on the pole member comprise two sets of annular non-interdigitated projections with the projections of one of the annular sets having a first polarity and the projections of the other of the annular sets having a second polarity opposite from the first polarity when the field coil is energized.

Still another object of the present invention is to provide a new and improved electromagnetic coupling as recited in the next preceding paragraph wherein an annular insulating member is interposed on the pole member between the two annular sets of projections to insulate the sets from each other.

Further objects and advantages of the present invention will become apparent from the following detailed description thereof taken in conjunction with the drawings wherein.

The present invention relates to an electromagnetic coupling having an input member, an output member, a single support inductor drum member attached to the input member for rotation therewith and a "cookie" type pole member attached to the output member for rotation therewith. A stationary annular coil is provided to establish a flux path between the pole member and the inductor drum upon energization of the coil to thereby operatively connect the input member and the output member.

Figure 1:
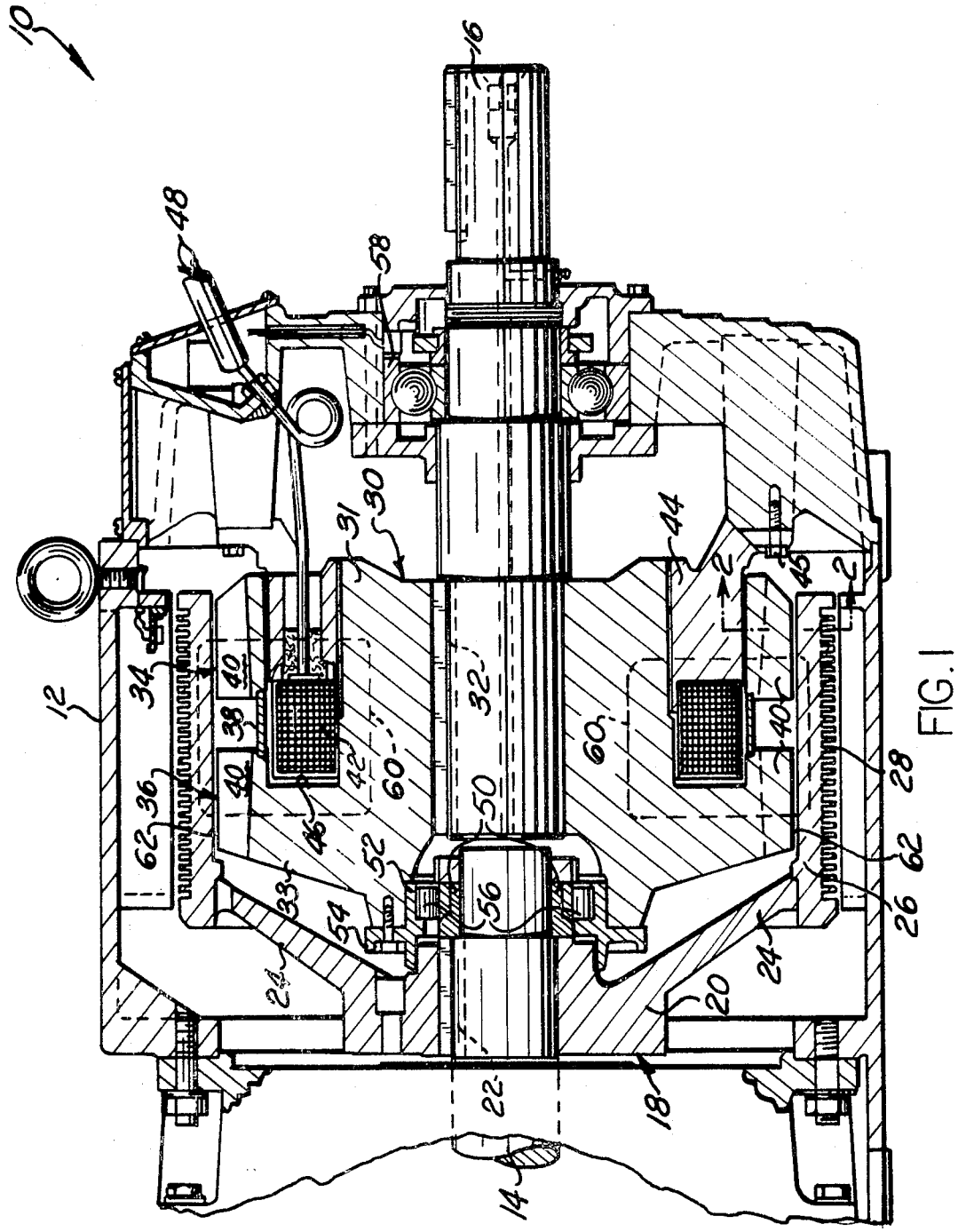
FIG. 1 is a cross sectional view of an electromagnetic coupling employing the present invention.

The electromagnetic coupling 10, illustrated in FIG. 1, includes a housing 12 having an input member 14 and an output member 16 associated therewith. The input and output members 14 and 16 comprise input and output shafts, respectively, which are rotatably supported for rotation relative to each other in the housing 12. The input and output shafts 14 and 16 are disposed in a coaxial relationship within the housing 12 and a prime mover, not illustrated, such as a motor is preferably connected with the input shaft 14 to effect rotation thereof.

Supported on the input shaft 14 for rotation therewith is an inductor drum member 18. The inductor drum member 18 which is of the single support type includes a hub portion 20 and a cylindrical portion 26. The hub portion 20 is affixed by a key 22 to the shaft 14 for rotation therewith. Radially extending from the axis of rotation of the hub portion 20 are a plurality of support arms 24 which support the cylindrical portion 26 of the inductor drum member 18 at one end thereof. The exterior surface of the cylindrical portion 26 of the inductor drum 18 includes a plurality of fins 28 therein which act to dissipate heat from the inductor drum member 18 to the air or cooling medium which flows around the inductor drum 18 to prevent excess heating thereof as will be described more fully hereinbelow. The construction of the single support inductor drum member 18 with the cylindrical portion 26 supported only at one end thereof by the radially extending arms 24 provides a construction which is lighter and more compact than the construction of the known double support inductor drums wherein the cylindrical portion is supported at both ends thereof.

Figure 2:
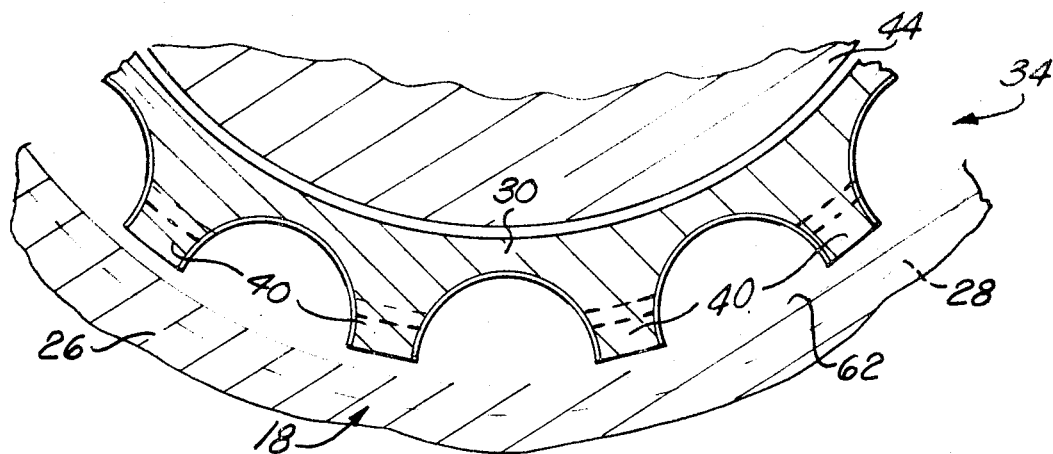
FIG. 2 is a cross sectional view, taken approximately along the line 2—2 of FIG. 1, illustrating the construction of the pole member.

A pole member 30 is affixed to the output shaft 16 by a key member 32 for rotation therewith. The pole member 30 includes a hub portion 31 and a radially extending portion 33 which supports first and second annular sets 34 and 36 of non-interdigitated projections. The annular sets 34 and 36 each include a plurality of individual spaced apart projections 40 more fully illustrated in FIG. 2 which project in a radial direction from the axis of rotation of the pole member 30. The individual projections 40 of the annular sets 34 and 36 are disposed around the exterior portion of the pole member 30 concentric with the axis of rotation of the output shaft 16. The two annular sets 34 and 36 of projections are spaced apart by an annular nonmagnetic insulating member 38 which magnetically isolates the projections of the first set 34 from the projections of the second set 36. The projections 40 of the annular sets of projections 34 and 36 are spaced from the cylindrical portion 26 of the inductor drum member 18 by an air gap 62. Pole members having non-interdigitated projections thereon such as the projections 40 are known generally in the art as "cookie" type poles due to the cross sectional configuration thereof which is more fully illustrated in FIG. 2.

An annular cavity 46 is formed in the pole member 30 and stationary annular field coil 42 is supported therein by a field member 44. The field member 44 is secured to the housing 12 by a plurality of bolts 45 to rigidly support the field member 44 in the annular cavity 46. It should be apparent that the coil 42 is supported so that the pole member 30 may rotate thereabout without interference from the coil 42 or the field member 44. A pair of leads 48 are connected to the coil 42 and provide for energization thereof by a suitable DC power source not illustrated. The fact that the field coil is rigidly mounted alleviates the need for slip rings and other associated mechanism which tend to wear with use.

Attached to the input shaft 14 is a bearing sleeve 50 which cooperates with a bearing sleeve 52 which is secured to the pole member 30 by a plurality of screws 54. Disposed between the bearing sleeves 50 and 52 are a plurality of cylindrical roller bearings 56. The sleeves 50 and 52 and the roller bearings 56 cooperate to form a bearing assembly which acts to position the interior ends of the shafts 14 and 16 in a coaxial relationship relative to each other and provides for relative rotation of the shafts 14 and 16. A bearing assembly 58 is also provided on the end of the housing 12 to support the shaft 16 for rotation relative to the housing 12.

Energization of the coil 42 via the leads 48 effects establishment of a magnetic field having a flux path illustrated by the dotted lines 60 in FIG. 1. When the coil 42 is energized, the flux path runs through the field member 44, through the projections 40 of the first annular set 34 of projections, across the air gap 62 disposed between the projections 40 and the cylindrical portion 26 of the inductor drum member 18, through the cylindrical portion 26 of the inductor drum member 18, back across the air gap 62, through the projections 40 of the second annular set 36 of projections, through the hub portion 31 of the pole member 30 and back to the field member 44. The establishment of the magnetic field upon energization of the coil 42, having the flux path 60 which passes through the "cookie" type pole member 30 and the single support inductor drum 18, operatively connects the input shaft 14 and the output shaft 16.

Figure 3:
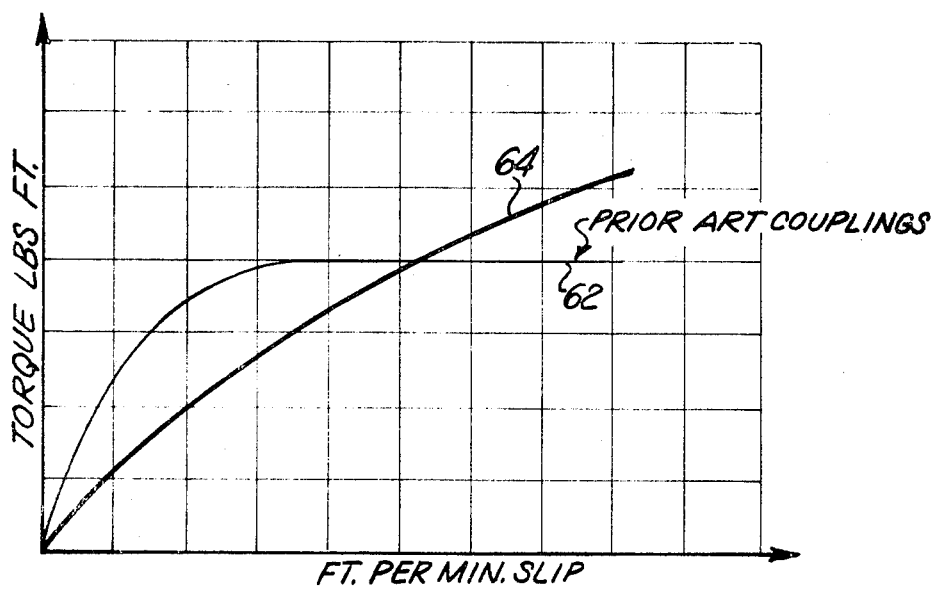
FIG. 3 is a graphical illustration of the torque plotted against the slip for the coupling of the present invention as compared to prior art couplings.

The amount of rotary slip between the inductor drum 18 and the cookie pole member 30 or the input shaft 14 and the output shaft 16 is dependent upon the resisting torque or load applied to shaft 16 and the intensity of the field established by coil 42. The intensity of the field is controlled by the magnitude of the current flowing through coil 42. For greater current and/or less torque there is less slip, and for less current and/or greater torque there is more slip. The amount of slip between the inductor drum 18 and the pole member 30 is proportional to the heat generated internally of the coupling. Thus, the greater the slip the greater the heat generated. The provision of the fins 28 helps to dissipate the heat built up in the coupling member as a result of the slippage to the cooling medium which in the present instance is air which flows through suitable openings in the housing 12. It should be appreciated that the flux path established by the coil 42 flows through the projections 40 of the annular sets of projections 34 and 36. The projections act to concentrate the flux path therethrough between the inductor drum 18 and the "cookie" type pole member 30. The concentration of the flux path by the projections 40 enables the present coupling to transmit torque at various slip speeds in accordance with the curve 64 illustrated in FIG. 3. This is a vast improvement over similar sized prior art couplings whose torque slip characteristics are illustrated by the curve 62 in FIG. 3. It should be noted that the present coupling utilizing a "cookie" type pole member and a single support inductor drum has much higher torque transmitting capacity at high slip speeds than similar sized prior art couplings. Specifically, tests run on similar sized eddy current couplings and the present couplings show that the coupling of the present invention has a 50% higher torque transmitting capacity.

The insulating member 38 acts to magnetically insulate the annular set 34 of projections from the annular set 36 of projections. Thus, the annular set of projections 34 will have a one polarity and the annular set of projections 36 will have a second polarity which is opposite the first polarity due to the insulating effect of the insulating member 38. When the flux path 60 is established upon energization of the coil 42, the intensity of the flux will affect the amount of slip between the inductor drum 18 which is rotating with the input shaft 14 and the rotor member 30 which is rotating with the output shaft 16.

The utilization of a single support inductor drum 18 and the "cookie" type pole member 30 provides a coupling which is lighter and more compact than prior art couplings of the same size. Moreover, the coupling of the present invention provides excellent overload protection at high speed slip due to the configuration thereof. It should be apparent from FIG. 3 that the output of the prior art couplings illustrated by the curve 62 tends to level off at high slip while the present coupling whose output is illustrated by the line 64 is operable to provide increased torque with increased slip. This characteristic, along with the size of the coupling enables the coupling to be utilized in many applications where the prior art couplings would not suffice.

It should be apparent from the foregoing that a new and improved electromagnetic coupling has been provided. The electromagnetic coupling includes a single support inductor drum, a stationary field coil, and a pole member having two annular sets of spaced apart projections thereon located between the field coil and the inductor drum. The two annular sets of projections are spaced apart by an insulating member which magnetically isolates the two annular sets of projections so that the projections of one set have a first polarity and the projections of the second set have a polarity opposite to the first polarity. The construction provides a new and improved electromagnetic coupling which is smaller in size and which has higher torque capabilities than the electromagnetic couplings of the prior art. While the present construction has been illustrated in an air cooled electromagnetic coupling it should be realized that the construction is equally applicable to liquid cooled couplings as well.

I claim:

1. An electromagnetic coupling comprising a housing, rotatably supported input and output members mounted in a coaxial relationship relative to each other in said housing, a stationary electrically energizable annular coil disposed in said housing, a field member having a unitary construction for rigidly supporting said coil in said housing and being formed from an inductive material, a single support inductor drum member operatively connected with one of said input and output members for rotation therewith, said inductor drum member including a cylindrical portion disposed coaxial to said input and output members and a support portion extending in a substantially radial direction from said cylindrical portion, said support portion being connected to said one member and being connected to said cylindrical portion at one end of said cylindrical portion for supporting said cylindrical portion for rotation with said one member, a pole member connected to the other of said input and output members for rotation therewith, said pole member including first and second annular sets of spaced apart aligned non-interdigitated projections thereon, said projections of said first set having a first polarity when said coil is energized and said projections of said second set having a second polarity opposite said first polarity when said coil is energized, said first and second annular sets of projections being interposed between said cylindrical portion of said inductor drum and said annular coil, said coil when energized establishing a flux path which sequentially passes from said field member, through said first annular set of projections, from said first annular set of projections, through said cylindrical portion of said inductor drum and from said cylindrical portion of such inductor drum through said second annular set of projections back to said field member to operatively connect said input and output members, said first and second annular sets of projections on said pole member cooperating with said cylindrical portion of said inductor drum to intensify the flux path between said first and second projection and said inductor drum to provide increased torque under high slip conditions between said inductor drum and said pole member.

2. An electromagnetic coupling as defined in claim 1 wherein said pole member further includes an annular insulating member disposed between said first and second annular sets of projections for magnetically insulating said first annular set of projections from said second annular set of projections.

3. An electromagnetic coupling as defined in claim 2 wherein said projections of each of said first and second annular sets of projections are integrally formed from a single conductive member and extend in a radial direction from said input and output members.

4. An electromagnetic coupling as defined in claim 3 wherein said input member includes a first bearing sleeve disposed at one end thereof, said pole member includes a second bearing sleeve attached thereto, and further including a plurality of cylindrical bearings disposed between said first and second bearing sleeves, said first and second bearing sleeves and said cylindrical bearings cooperating to form a bearing assembly which supports said input and output members in a coaxial relationship within said housing and provides for relative rotation between said input and output members.

5. An electromagnetic coupling as defined in claim 3 wherein said pole member includes an annular cavity therein and said annular coil is supported by said field member in said annular cavity, said annular cavity enabling said pole member to rotate about said annular coil.

* * * * *